United States Patent
Pharn

(10) Patent No.: US 9,015,748 B2
(45) Date of Patent: *Apr. 21, 2015

(54) SYSTEM AND METHOD FOR APPROXIMATING CHARACTERISTICS OF HOUSEHOLDS FOR TARGETED ADVERTISEMENT

(71) Applicant: Abroadcasting Company, Santa Ana, CA (US)

(72) Inventor: Art Pharn, Huntington Beach, CA (US)

(73) Assignee: Abroadcasting Company, Huntington Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/132,256

(22) Filed: Dec. 18, 2013

(65) Prior Publication Data

US 2014/0215503 A1   Jul. 31, 2014

Related U.S. Application Data

(63) Continuation of application No. 11/948,837, filed on Nov. 30, 2007, now Pat. No. 8,621,506.

(60) Provisional application No. 60/981,427, filed on Oct. 19, 2007.

(51) Int. Cl.
- *H04N 7/10* (2006.01)
- *H04N 21/466* (2011.01)
- *H04H 20/10* (2008.01)
- *H04H 60/66* (2008.01)
- *H04N 21/25* (2011.01)
- *H04N 21/266* (2011.01)
- *H04N 21/2668* (2011.01)
- *H04N 21/475* (2011.01)
- *H04N 21/81* (2011.01)
- *H04N 21/435* (2011.01)
- *H04N 21/442* (2011.01)
- *H04H 60/33* (2008.01)

(52) U.S. Cl.
CPC ......... *H04N 21/4667* (2013.01); *H04H 20/103* (2013.01); *H04H 60/33* (2013.01); *H04H 60/66* (2013.01); *H04N 21/252* (2013.01); *H04N 21/26603* (2013.01); *H04N 21/2668* (2013.01); *H04N 21/4756* (2013.01); *H04N 21/812* (2013.01); *H04N 21/435* (2013.01); *H04N 21/44213* (2013.01); *H04N 21/475* (2013.01)

(58) Field of Classification Search
USPC .......................... 725/9–14, 16, 24, 32, 34–35
See application file for complete search history.

(56) References Cited

U.S. PATENT DOCUMENTS

| | | |
|---|---|---|
| 5,694,162 A * | 12/1997 | Freeny, Jr. ...................... 725/116 |
| 6,317,881 B1 | 11/2001 | Shah-Nazaroff et al. |
| 6,457,010 B1 | 9/2002 | Eldering et al. |
| 6,530,082 B1 | 3/2003 | Del Sesto et al. |
| 7,302,696 B1 | 11/2007 | Yamamoto |
| 2004/0117831 A1 | 6/2004 | Ellis et al. |
| 2005/0022239 A1 | 1/2005 | Meuleman |
| 2008/0027801 A1 | 1/2008 | Walter et al. |

* cited by examiner

*Primary Examiner* — Nicholas Corbo

(74) *Attorney, Agent, or Firm* — Knobbe, Martens, Olson & Bear, LLP

(57) ABSTRACT

During the display of video content to a viewing audience, a system receives feedback information from the viewing audience concerning the displayed video content. At a later time and based on the feedback, the system substitutes portions of a downloaded data stream with different content.

20 Claims, 14 Drawing Sheets

| | | |
|---|---|---|
| Gender | • | Female |
| | • | Male |
| Age | • | Infant |
| | • | Toddler |
| | • | Teen |
| | • | Adult |
| | • | Senior |
| Goods/ Services | • | Apparel and Accessories |
| | • | Appliances |
| | • | Automobile Products and Services |
| | • | Cosmetics and Toiletries |
| | • | Department Store |
| | • | Drug Store |
| | • | Drink Products and Services |
| | • | Electronics |
| | • | Entertainment |
| | • | Food Products and Services |
| | • | Home Products |
| | • | Loan Products and Service |
| | • | Office Products and Services |
| | • | Insurance Products and Services |
| | • | Pets |
| | • | Sport and Recreation |
| | • | Super Market |
| | • | Toys and Games |
| | • | Travel and Leisure |

Gender and Age rows grouped as 800; Goods/Services rows grouped as 810.

FIG. 8

| Gender | ✓ | Female | } 920 |
| | ✓ | Male | |
| Age | • | Infant | } 910 |
| | • | Toddler | |
| | ✓ | Teen | |
| | ✓ | Adult | |
| | ✓ | Senior | |
| Goods/ Services | • | Apparel and Accessories | ← 900 |
| | • | Appliances | |
| | ✓ | Automobile Products and Services | |
| | • | Cosmetics and Toiletries | |
| | • | Department Store | |
| | • | Drug Store | |
| | • | Drink Products and Services | |
| | • | Electronics | |
| | • | Entertainment | |
| | • | Food Products and Services | |
| | • | Home Products | |
| | • | Loan Products and Service | |
| | • | Office Products and Services | |
| | • | Insurance Products and Services | |
| | • | Pets | |
| | • | Sport and Recreation | |
| | • | Super Market | |
| | • | Toys and Games | |
| | • | Travel and Leisure | |

FIG. 9

SYSTEM AND METHOD FOR APPROXIMATING CHARACTERISTICS OF HOUSEHOLDS FOR TARGETED ADVERTISEMENT

CROSS-REFERENCE TO RELATED APPLICATIONS

This application is a continuation of U.S. application Ser. No. 11/948,837, incorporated herein by reference, and filed Nov. 30, 2007, which claims the benefit of priority to Provisional Application No. 60/981,427 filed Oct. 19, 2007.

FIELD

Embodiments of the present invention generally relate to the field of entertainment, and more particularly to a system and method for replacing advertisements in a broadcast video signal with audience-specific advertisements.

BACKGROUND

Currently, there exist closed loop addressable advertising (CLAA) systems, namely systems designed to replace an original televised commercial in a broadcast television signal with a substitute televised commercial. The substitute televised commercial targets a particular demographic who will find that commercial more interesting and informative than the original televised commercial.

While a targeted televised commercial most likely offers an increased rate of return and improves the overall viewing experience, obtaining personal preferences for viewers has become increasingly more difficult. One reason for this difficulty is due, in part, to the desire by viewers in avoiding the receipt of mass mailing (electronic and regular mail) and other intrusive advertisements initiated by companies that may have obtained contact information for these individuals from surveys. Furthermore, the fear of identity theft may cause viewers to provide false or inaccurate information during a registration process.

BRIEF DESCRIPTION OF THE DRAWINGS

The invention may best be understood by referring to the following description and accompanying drawings that are used to illustrate embodiments of the invention.

FIG. 8 is an illustrative embodiment of the categories used to identify the content of an advertisement.

FIG. 9 is a specific example of the categories selected to identify a luxury car advertisement.

DETAILED DESCRIPTION

Figure 1A:
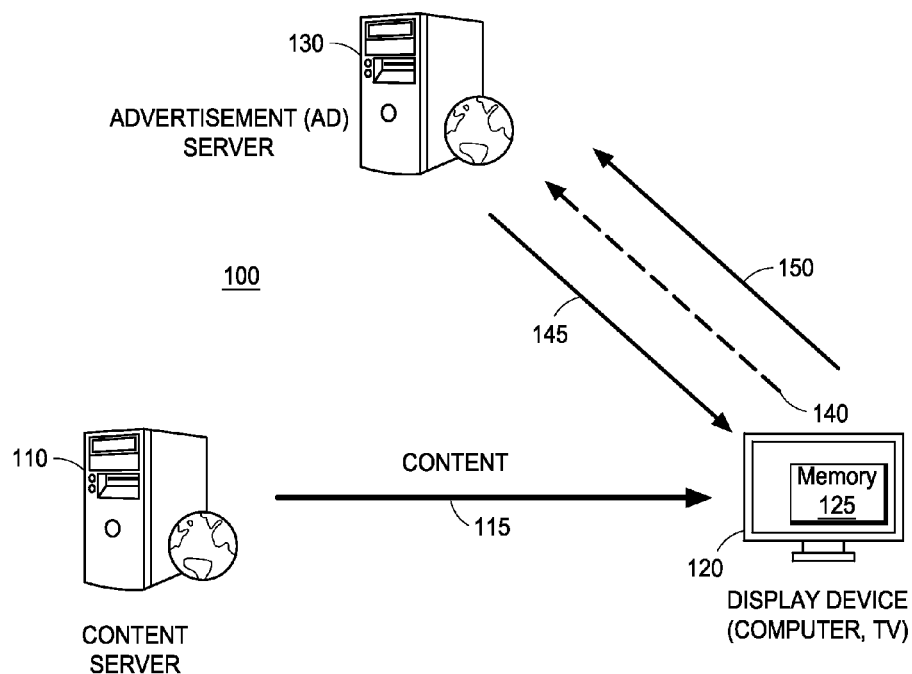
FIGS. 1A-1D are illustrative embodiments of a communication system.

In general, one embodiment of the invention relates to a system and method for gathering feedback information directed to advertisements and/or programming currently being watched or has been watched recently. The feedback information may be more readily available for those situations where viewers cannot avoid viewing advertisements, such terrestrial TV broadcast and Internet TV where personal video recorders (PVRS) are not available.

By collecting feedback information over a prolonged period of time and in a non-intrusive way, after analysis, characteristics of a viewer's household (hereinafter referred to as the "household profile") can be approximated for the purpose of providing advertisements that are more entertaining and relevant to each viewer. The "household profile" may include the estimated number of members of the household and the demographics for that household (e.g., genre, general age groups, etc.)

The household profile is formulated using collected feedback information, where both similarities and differences in feedback concerning programming and/or advertisements are useful in determining the household profile. For instance, feedback that indicates a substantial reversal of a particular interest is of value because it identifies a likely situation that multiple residents occupy this household. As an example, a television program may provide a first order of approximation of the household profile while ads within the television program provides more granularity, and in fact, a second order of approximation of the household profile.

An advertisement server uses the household profile to make an initial selection as to which advertisements are best suited for that household and refines its selection concerning subsequently downloaded advertisements based on feedback. For instance, upon reviewing a negative feedback concerning a televised (IPTV) cosmetic commercial during a current viewing session, it is likely that the viewing audience is a person who does not wear cosmetics (e.g., male). Moreover, such feedback may further indicate that there are potentially multiple residents (e.g., also a female) if positive feedback for cosmetic commercials has been received in the past.

In addition, combined with other contemporaneous feedback, this information may be used to better estimate the viewing audience. For instance, negative feedback for cosmetic commercial during a sitcom program may indicate a male audience. Additional positive feedback for preteen video game commercial during the same program may further narrow this male audience to a male teenager.

In the following description, certain terminology is used to describe various features of one or more embodiments of the invention. For instance, the term "display device" is generally considered any electronic device that is capable of receiving, processing and/or displaying audio/video (AV) content, such as video and/or audio streams for example. Examples of a "display device" include, but are not limited or restricted to a computer (e.g., laptop, tablet, handheld, desktop, server or maintain with terminal, etc.), a cellular telephone, a television, a video game player, and the like.

"Software" is generally defined as one or more instructions that, when executed, cause the node to perform a particular function or functions. These instructions may be stored within machine-readable medium such as firmware or software. "Machine-readable medium" is any medium that can at least temporarily store information including, but not limited or restricted to the following: an electronic circuit, a semiconductor memory device (non-volatile or volatile), a hard disk drive, and various types of portable storage devices (e.g., flash drive, compact disc "CD", digital versatile disk "DVD", etc.).

"Substitute Advertisements" are generally defined as one or more replacement advertisements whose combined length of time are greater than zero seconds but may be shorter, longer or the same length of time as the original advertisement. In the case where the length of time of original advertisement is zero seconds, the substitute advertisement can also be referred to as "Inserted Advertisements".

"Program Category" is defined as a class of programs with common or similar genres. For instance, Program Categories can be children cartoon, preteen cartoon, teen cartoon, preteen girl sitcom, preteen boy sitcom, and adult drama.

"Advertisement-Program Category Pair" is defined as a specific advertisement displayed during a specific program category. For instance, fast-food commercial during preteen sitcom program would be different Advertisement-Program Category Pair than the same commercial displayed during adult drama program. Advertisement-Program Category Pair is used to differentiate each members of household. For instance, a household composed of one adult who do not like fast-food, one preteen who likes fast-food and another preteen who does not like fast-food, may provide substantial negative feedbacks on fast-food commercial during adult drama and both substantial positive and negative feedbacks on the same commercial during various preteen sitcom programs.

"IP Address" is generally defined as either static IP address or dynamic IP address. IP Address cannot always identify unique user (e.g., dynamic IP address is leased to a user for short time period).

"Username" is generally defined as a unique name a user provides during account registration process. Username cannot be used to uniquely identify user's location (e.g., user can login at different location such as home or work). Username can be shared among all members of a household. Username cannot be used to identify a specific member of household.

"Username-IP Address pair" is defined as combination of IP Address and username. The username-IP address pair can be used to associate a specific user with a specific location. This information is used in selection of appropriate advertisement for the user. For instance, a user may be at a hotel on a business trip where advertisements of nearby restaurants to the hotel may be more applicable than advertisements concerning goods or services near one's home.

Referring now to FIG. 1A, a first illustrative embodiment of a communication system 100 is shown, where system 100 is adapted to substitute advertisements before playback in response to feedback information from a viewer. Communication system 100 comprises a content server 110 (e.g., a television station, cable head-end system, etc.), a display device 120, and an advertisement server 130. Display device 120 receives a data stream from server 110 and substitute advertisements (if any) from server 130.

More specifically, content server 110 is adapted to transmit a data stream to one or more display devices (e.g., display device 120). According to one embodiment of the invention, the data stream includes digital content such as programming (e.g., television shows, webcasts, podcasts, movies, etc.) interspersed between advertisements. The digital content is routed over a communication link 115 to display device 120. Display device 120 is adapted to communicate with advertisement server 130 in order to provide feedback information 150 pertaining to programming and/or advertisements seen by the viewer and receive substitute advertisements for display as needed.

As an optional feature, display device 120 may be further adapted to provide information concerning the programming received by display device 120. This information allows the advertisements to be better tailored to the anticipated viewer. More specifically, display device 120 uploads an identifier 140 for the programming currently being viewed to advertisement server 130.

As an optional feature, identifier 140 uploaded to advertisement server can be used to refine household profile. For instance, positive feedback for boy preteen shoes during cartoon programming would indicate a high probability of a young male audience in the household. Furthermore, later substantial reversal of feedback of the same or similar advertisement on the same or similar cartoon programming would indicate a probability of either another preteen boy audience with no interest in shoes or a girl audience. Additional feedback would provide better prediction whether the second child is a boy or a girl audience.

The information about program currently being viewed allows for a better prediction of household profile. This feature is useful only on a display device where software does not operate continuously without any audience. Example of such display devices include, but are not limited or restricted to cable TV set-top boxes or satellite TV set-top boxes. In other display devices such as TV, computer and cell phone, user normally turns off or terminates the software at the end of the viewing.

The invention can identify different members of the household as long as their interests can be distinguishable. A TV program is designed to gain a wide range of audiences. On the contrary, a TV advertisement is typically created to attract attention of much smaller groups of audiences. Advertisement feedback would narrow down the audience into smaller group. For instance, as shown in FIG. 1D, positive feedback of health and beauty TV advertisement 191 during preteen children programming 190 might indicate a preteen girl audience 192. A negative feedback might indicate a preteen boy audience 193. More feedback would add to higher probability for the estimation.

The principal is based on an assumption that majority of TV programs and TV advertisements attract their intended audiences. Smaller anomaly or error can be isolated and removed from the samples. Anomaly or error indicates that TV programming or TV advertisement attract wrong audiences. This error can be used by appropriate producer to future refine or improve the production.

Upon analysis of the household profile formulated based on previous feedback by persons associated with an IP address reserved for display device 120 (and perhaps based on the particular programming received), advertisement server 130 routes one or more substitute advertisements 145 to display device 120. Substitute advertisements 145 may initially be a default advertisement based on the geographic location associated with the IP address as well as the type of content associated with the program being viewed. In the alternative, in response to signaling from display device 120, substitute advertisements 145 selected in accordance with the household profile are downloaded into storage memory 125 adapted to store advertisements. As a result, advertisements contained in the data stream are substituted as needed for advertisements stored in storage memory 125.

While storage memory 125 provides the ability to store advertisements for later and repeated uses, it is contemplated that a real-time advertisement substitution system may be implemented through the placement of pre-markers located in the data stream to identify a predetermined time before the advertisement is displayed. The pre-markers enable display device 120 to query advertisement server 130 or storage memory 125 for substitute advertisements 145. This real-time advertisement substitution scheme provides more reliability to ensure that the advertisements are targeted to the viewing audience.

Figure 1B:
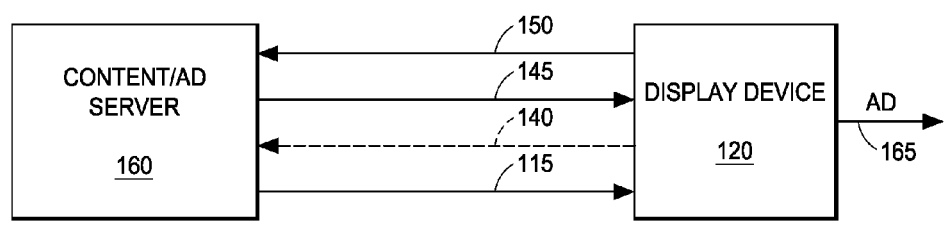

Referring now to FIG. 1B, a second illustrative embodiment of the architecture of communication system 100 is shown. In lieu of a separate advertisement server, a server 160 is provided with the functionality of both content server 110 and advertisement server 130 of FIG. 1A (hereinafter "content/ad server" 160).

Similar in operation to FIG. 1A, display device 120 may be adapted to receive digital content, and thereafter, optionally upload signals to identify receipt of pre-markers within the data stream. It is contemplated that content/ad server 160 already knows the particular programming downloaded to display device 120. Upon receipt of the uploaded signals, content/ad server 160 may download one or more substitute advertisements or inserted advertisements for display in lieu of advertisements currently in the data stream provided with the programming.

Herein, a viewer further provides feedback information 150 to content/ad server 160 based on current or previously viewed programming and/or advertisements. Display device 120 may further re-route advertisement 165 to other display devices when display device 120 operates as part of a serial communication link with other display devices that are adapted to receive programming and/or advertisements from display device 120.

Figure 1C:
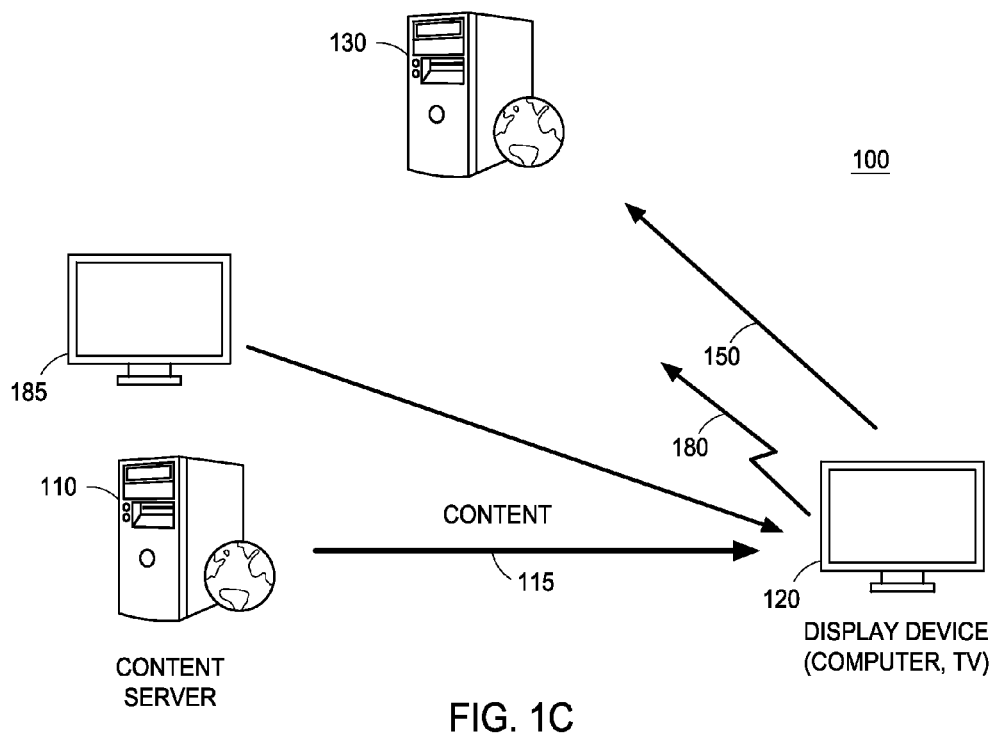
Figure 1D:
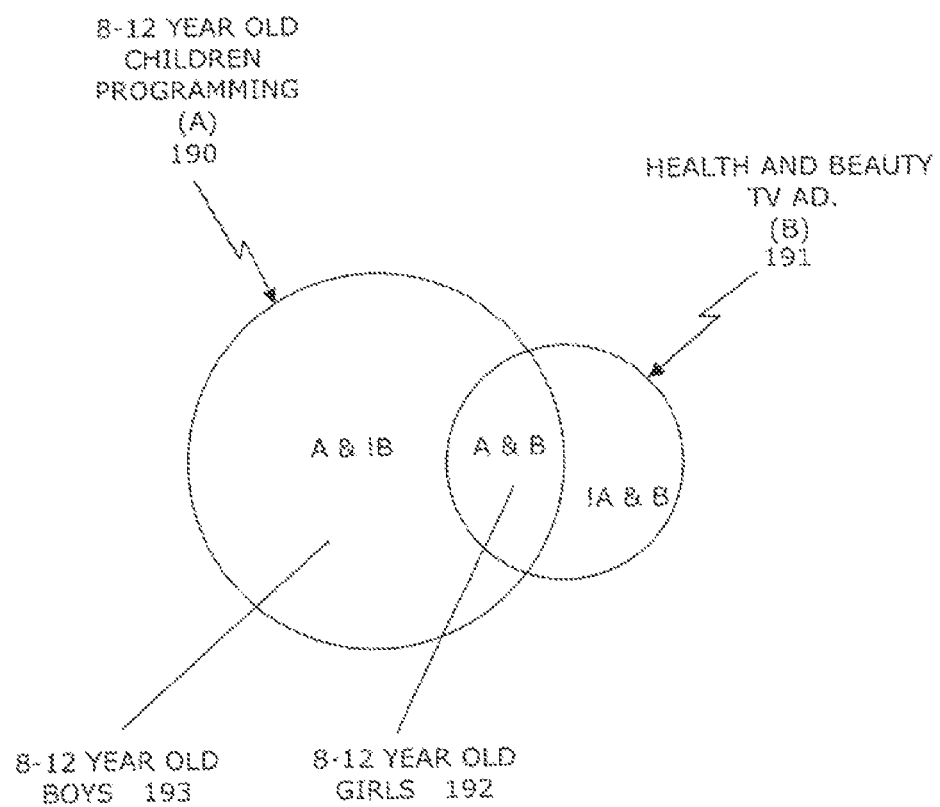

Referring now to FIG. 1C, a third illustrative embodiment of computer communication system 100 is shown. Upon receipt of the digital content over communication link 115, display device 120 transmits a broadcast or multicast or unicast signal 180 that targets a number of electronic devices. For instance, signal 180 is a REQUEST message for requesting a particular advertisement or a particular genre of advertisements. REQUEST signal 180 may be transmitted through a wired medium or over a wireless medium. Display device 185 detects REQUEST signal 180 and determines whether of its pre-stored advertisements are identical to (or in the same genre of) the advertisement identified in REQUEST signal 180. If so, display device 185 transmits the advertisement(s) to display device 120 for display.

Alternatively, in a system where the characteristics of storage memory within display device 120 (e.g., memory size) is known, an ad server can coordinate the transfer of advertisement from one or more display devices to others.

Similarly, display device 120 provides feedback information to advertisement server 130 that is used to better configure what advertisements are to be displayed by display device 120. Similarly, display device 120 provides feedback information to advertisement server 130 that is used to better configure the advertisements to be displayed with the household profile.

Figure 2:
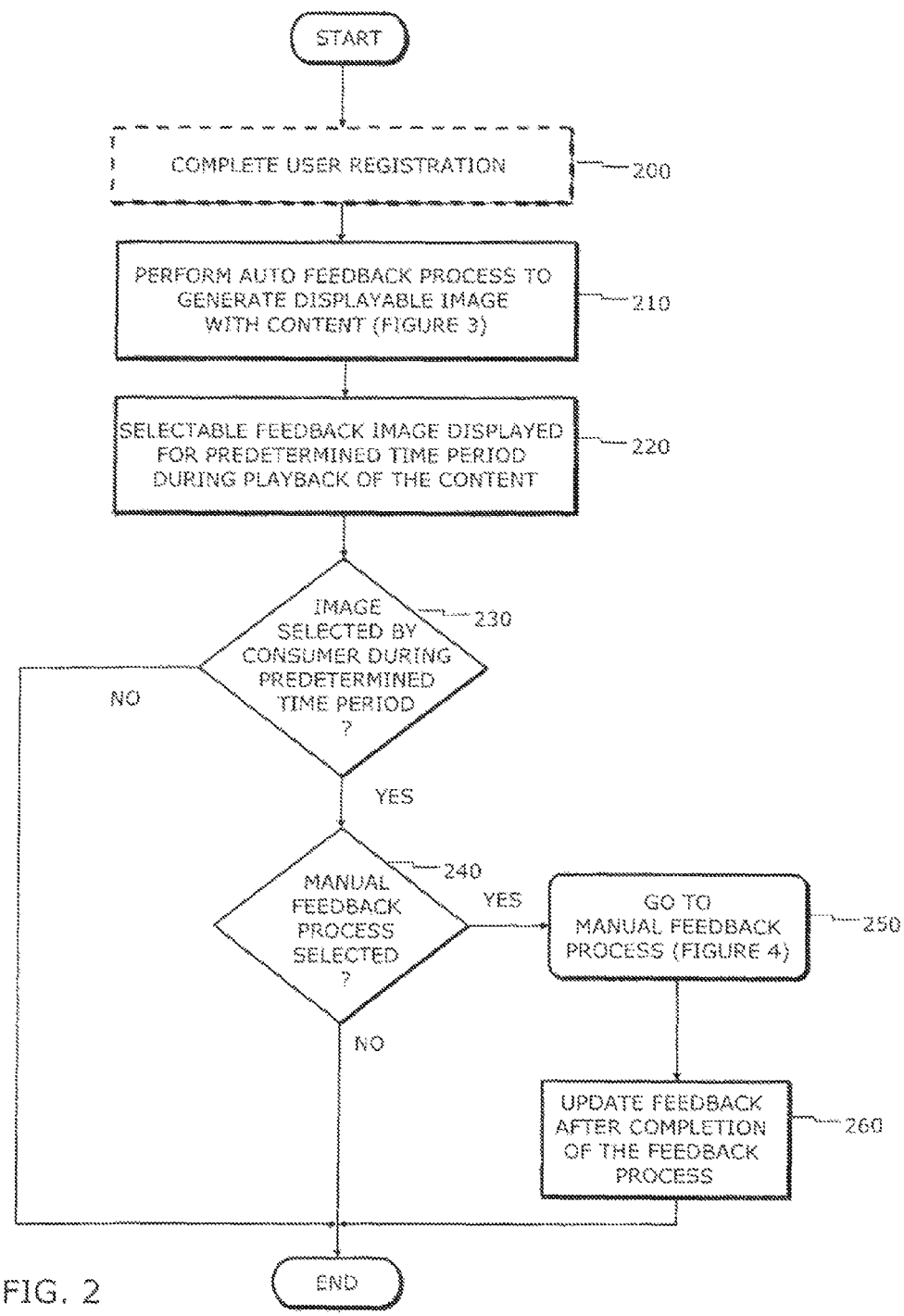
FIG. 2 is an illustrative embodiment of a flowchart outlining operations conducted by elements of the communication system in order to provide feedback concerning programming and/or advertisements.

Referring now to FIG. 2, an illustrative embodiment of a flow chart outlining operations conducted in order to provide feedback concerning programming and/or advertisements being displayed is shown. Initially, as an optional feature, one or more persons of a household would complete a registration process (block 200). According to one embodiment of the invention, the registration process is conducted on the display device in order to extract the static or dynamic IP address of the display device upon which content is downloaded. In addition, the registration process may be able to extract certain demographic (e.g., number of members of the household, ages, ethnicity, etc.) and viewer preference information in order to assist in the determination of the types of advertisements to be provided. Thereafter, an auto-feedback process is performed to generate displayable images with the content (block 210) as shown in FIG. 3A.

Figure 3B:
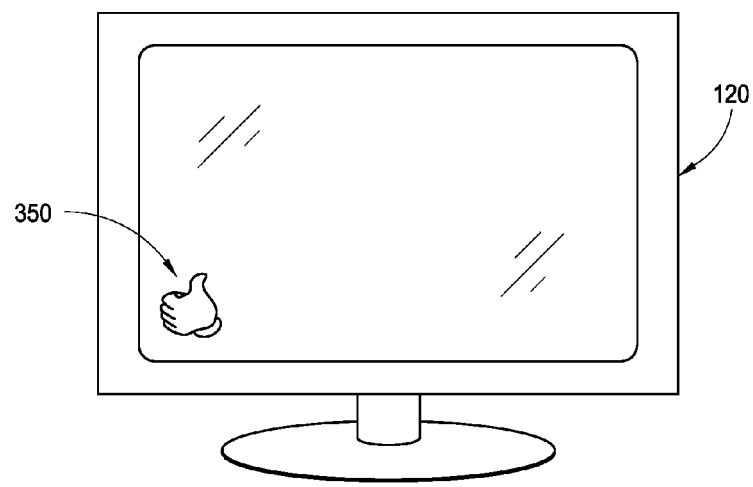
FIG. 3B is an illustrative embodiment of a feedback image displayed on a display device of the communication system of FIG. 1 to denote a general rating of the advertisement and/or program.
Figure 3A:
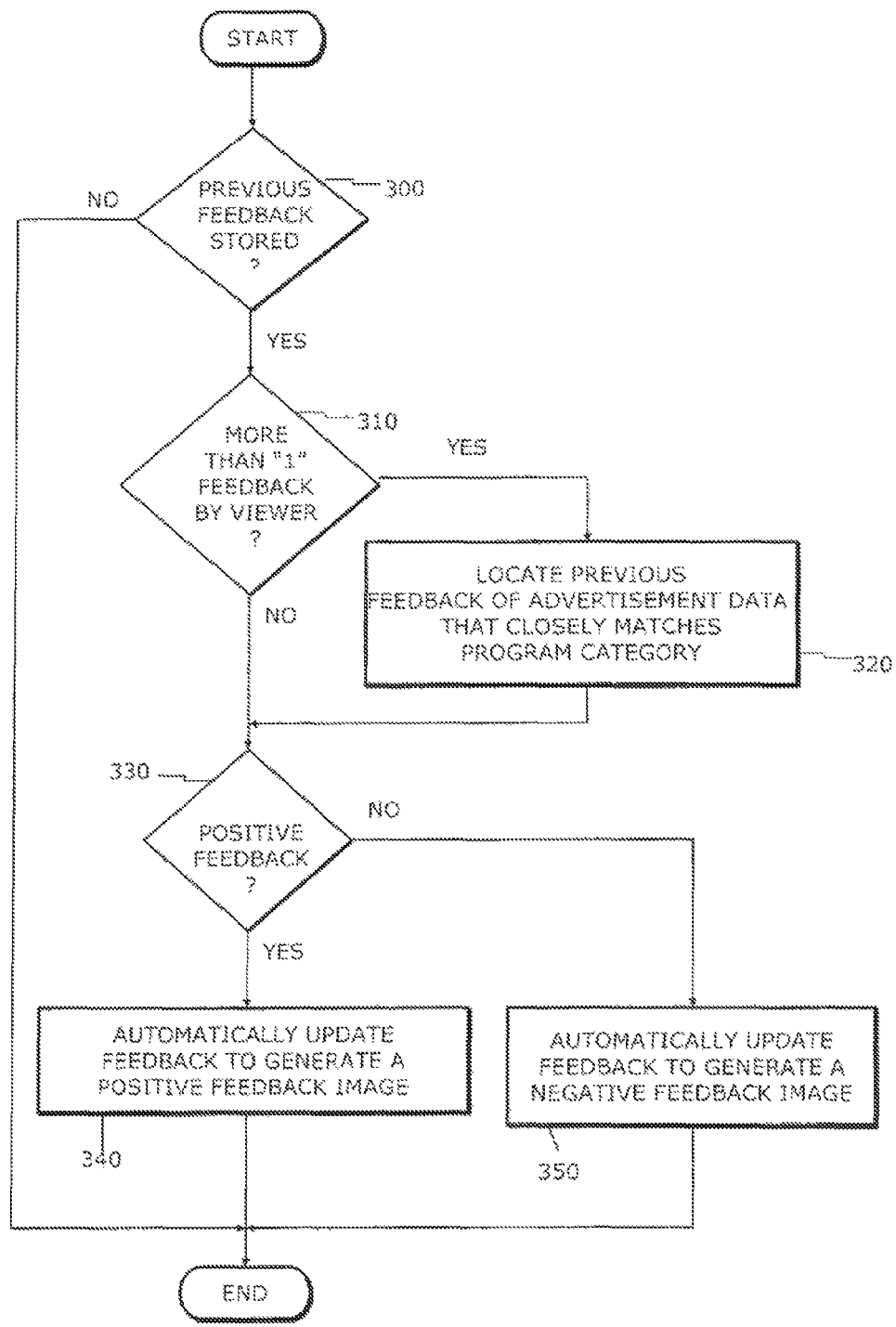
FIG. 3A is an illustrative embodiment of auto-feedback process for advertisement.

Referring now to FIG. 3A, an illustrative embodiment of auto-feedback process for advertisement is shown. The auto-feedback process is responsible for determining a suitable feedback image for display with the programming. According to one embodiment of the invention, a feedback image is substantially smaller than the displayed images associated with the programming or advertisement. For instance, the feedback image may be superimposed at a particular location proximate to a border of the displayed programming or advertisement images. As an illustrative example, as shown in FIG. 3B, a feedback image 350 may be a "thumbs up" representation to denote that the viewer approves of the advertisement while a "thumbs down" image to denote a lack of approval.

Initially, a determination is made whether there is any previous feedback for the particular advertisement stored (block 300). If no feedback has been previously stored, the auto-feedback process terminates. If feedback does exist, however, a determination is made whether more than one feedback result has been provided from a viewer of the display device (block 310) If so, a determination is made whether the previous feedback for the advertisement closely matches the category of the program currently to be displayed (block 320). For instance, there are previous feedbacks for the advertisement, negative one during adult drama program and positive one during children educational program. In addition, the advertisement is being displayed during preteen cartoon program. The auto-feedback process would select positive feedback to be displayed because children educational program is closer matched to preteen cartoon program than adult drama program.

Thereafter, a determination is made whether the feedback is positive (block 330). If so, auto-feedback process updates the positive feedback to generate a positive feedback image such as the "thumbs up" image as described above (block 340). Otherwise, if no positive feedback is provided, the auto-feedback process involves a negative feedback and a negative feedback image is generated for display (block 345).

Figure 3C:
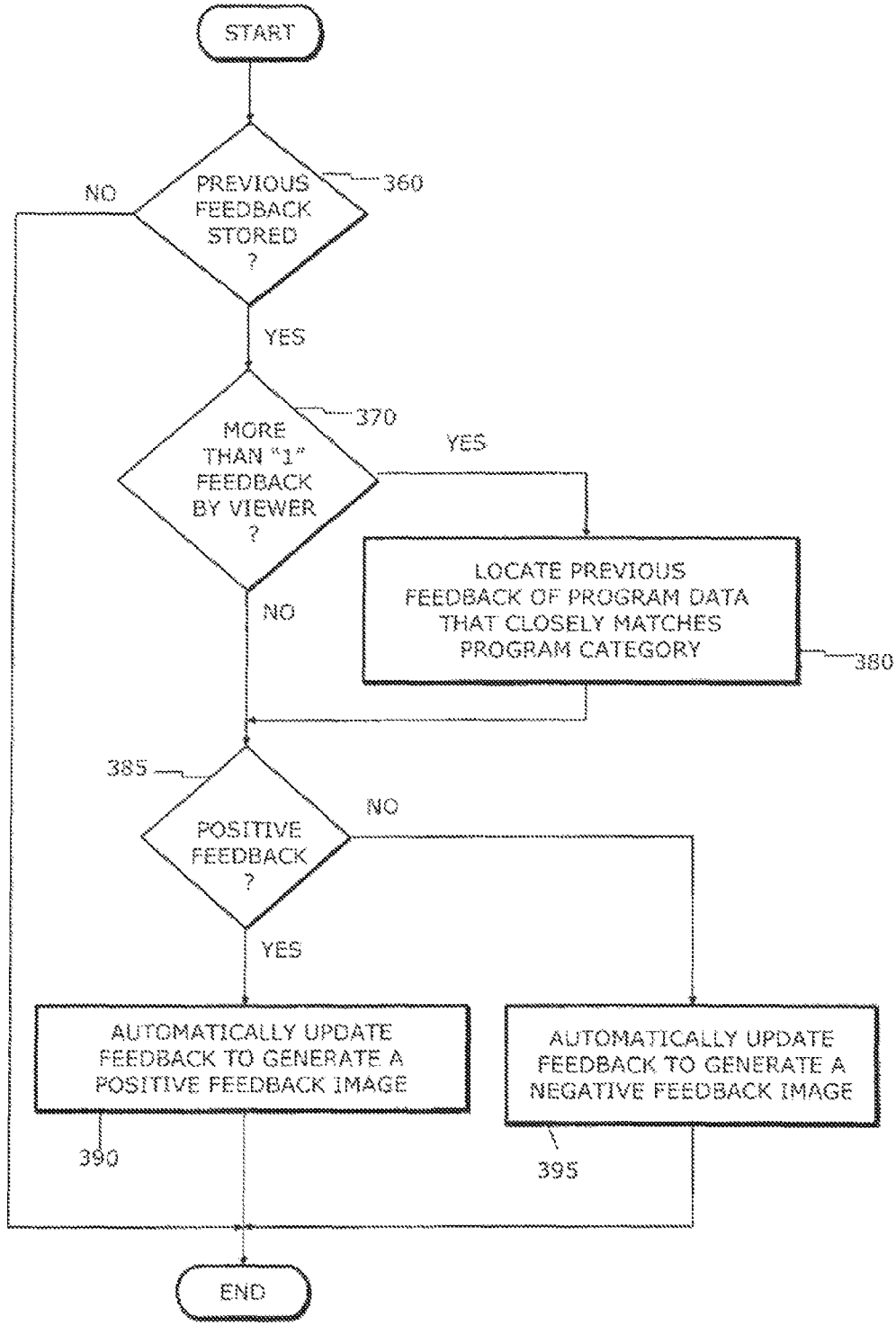
FIG. 3C is an illustrative embodiment of auto-feedback process for program.

Similar to FIG. 3A, FIG. 3C is an illustrative embodiment of auto-feedback process for a program. The same analysis applies where previous feedback is located (block 360) and if there is more than one feedback (block 370). If so, a determination is made as to which previous feedback is to be used (block 380). Thereafter, a determination is made whether the feedback is positive (block 385). If so, auto-feedback process updates the positive feedback (block 390). Otherwise, the auto-feedback process updates the negative feedback (block 395). The different between auto-feedback processes for advertisement and for program is the process of locating previous feedback data to be used 320 and 380. In advertisement process 320, previous feedback of advertisement data is chosen from the closest matched program category to the current program. In program process 380, previous feedback of program data is chosen from the closest matched program category to the current program.

Referring back to FIG. 2, a selectable feedback image produced by the auto-feedback process is displayed for a predetermined time during playback of the digital content (block 220). In the event that the feedback image is selected by the viewer during a predetermined time (block 230), a determination is made whether a manual feedback process has been selected (block 240). If not, or if the image is not selected by the viewer during the predetermined time, the process terminates. However, if the manual process feedback is selected, the manual feedback process undergoes the operations as set forth in FIG. 4 below (block 250).

Figure 4:
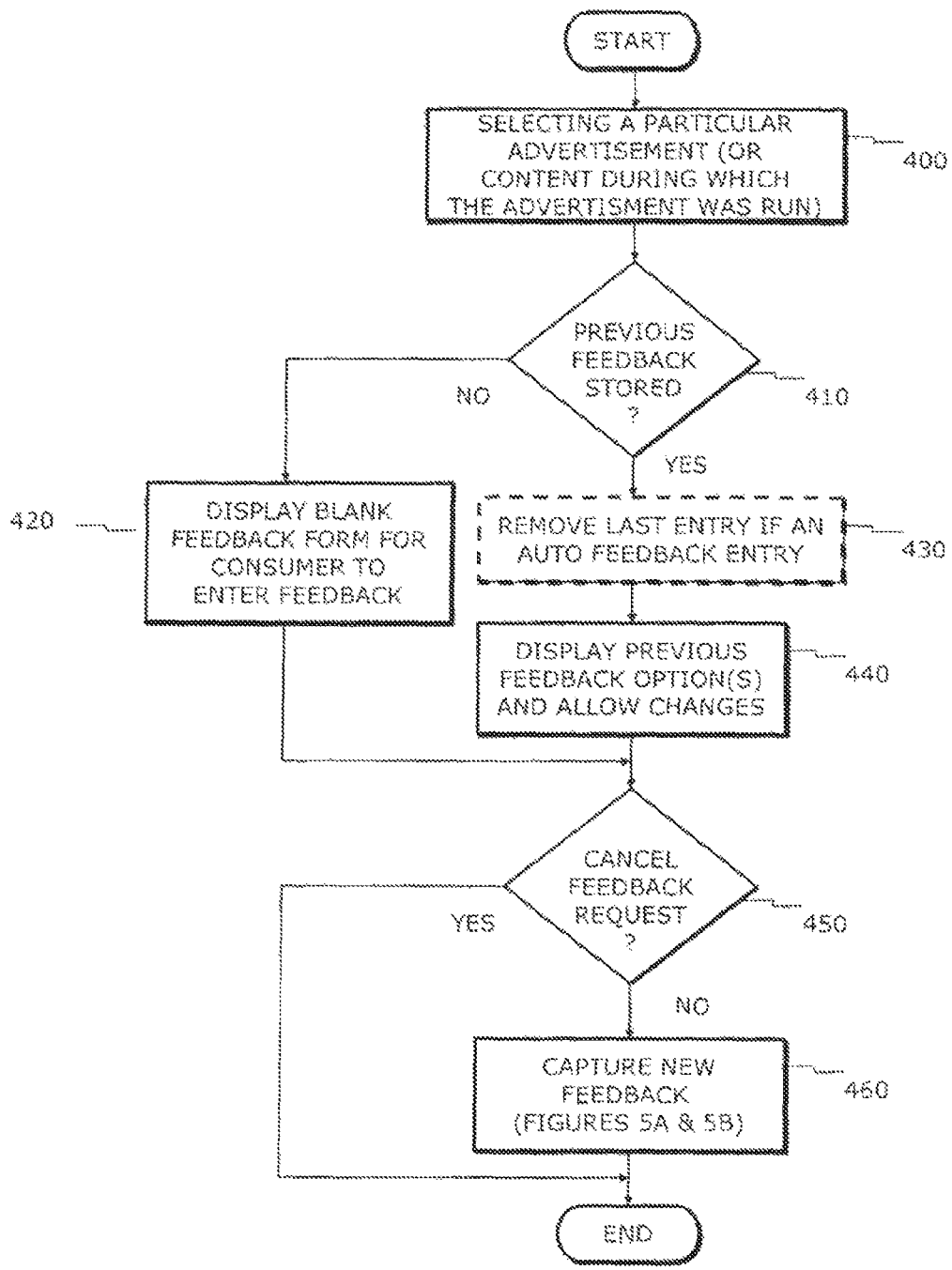
FIG. 4 is an illustrative embodiment of a manual feedback process in order to upload feedback information to an advertisement server of FIG. 1.

Referring now to FIG. 4, an illustrative embodiment of a manual feedback process in order to upload feedback information to an advertisement server is shown. Initially, a particular advertisement is selected (block 400). Such selection may be accomplished subsequent to display of that advertisement or during the time that the advertisement is being displayed. A determination is made whether previous feedback has been stored (block 410). If not, a blank feedback form is displayed for the viewer to enter feedback information (block 420). If feedback information has been previously stored, the last entry may be optionally removed if the entry is provided through the auto-feedback process (block 430). The reason is that this entry has been automatically generated in lieu of being generated by the viewer. Thereafter, previous feedback is displayed to allow for changes (block 440).

Next, a determination is made whether to cancel the feedback request (block 450). If so, the process terminates. Otherwise, new feedback information is captured (block 460) as shown in FIGS. 5A-5B.

Figure 5A:
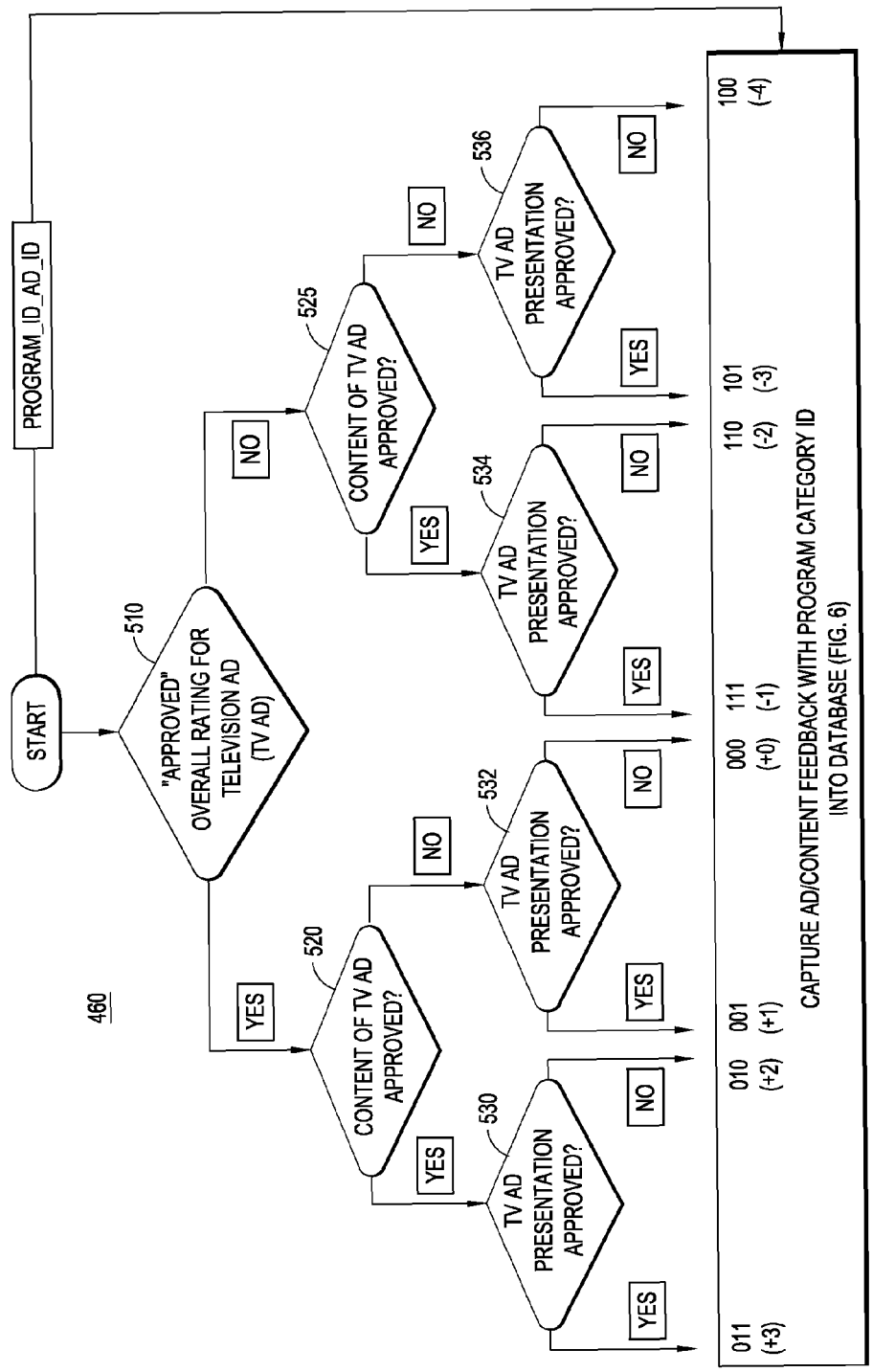
FIG. 5A is an illustrative embodiment of operations conducted by the advertisement server (or content/ad server) to create a feedback code for an advertisement.
Figure 5B:
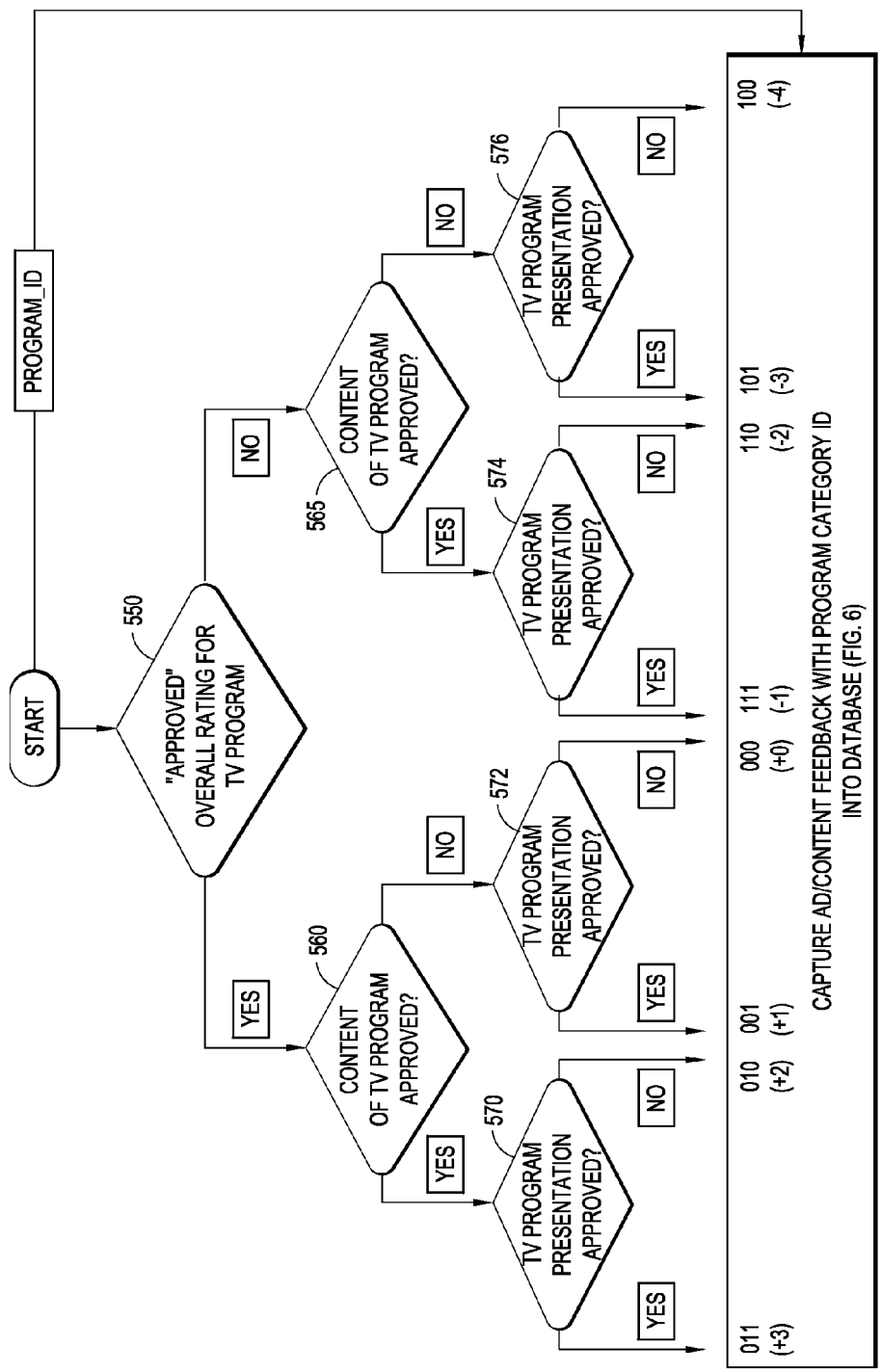
FIG. 5B is an illustrative embodiment of the processing conducted by the advertisement server to determine a feedback code for programming.

Referring now to FIG. 5A, an illustrative embodiment of operations conducted by the display device or advertisement server (or content/ad server) is shown. These operations compute feedback information concerning digital content (e.g., advertisement), namely a feedback code. The identifier of the programming (PROGRAM_ID) and an identifier of the advertisement (AD_ID) for playback with the programming are provided to a database for storage with a rating value (described below) that represents the approval or disapproval of a portion of the digital content. It is contemplated that both PROGRAM_ID and AD_ID can be used to separate the feedback for the same advertisement by different members of the household. For instance, feedback for fast food advertisement during a preteen comedy program would be kept separately from the same advertisement but during adult sitcom program.

In order to compute the feedback code, the overall rating of the advertisement is determined (block 510). If the advertisement received a positive rating (i.e. the advertisement has been "approved" by the viewing audience), the next determination is whether the content (subject matter) of a television advertisement has been approved (block 520). If the content has been approved, a final determination is whether the advertisement presentation has been approved (block 530). This "presentation" involves the composition of the aesthetics behind the advertisement such as acting, setting, dialogue, etc. If so, the approval rating is assigned a feedback code of "0-1-1" to denote the highest where both the overall advertisement is approved as well as its content and presentation.

In the event that advertisement presentation does not meet the approval of the viewing audience, a feedback code of "0-1-0" is assigned as the rating value. Similarly, in the event that the viewing audience does not approve of the content of the advertisement but approves of the presentation of the advertisement, a feedback code of "0-0-1" is assigned as the rating value for the advertisement. This differs from a feedback code of "0-0-0" which represents that both the content and presentation of the television advertisement have not been approved, but the overall rating of the television advertisement has been approved.

In the event that the overall rating of the television advertisement does not meet the approval of the viewing audience, a determination is made whether the content of the television advertisement has been approved (block 525). If the content of the advertisement has been approved and the presentation of the advertisement has been approved, a feedback code of "1-1-1" is assigned the advertisement (block 534). In the event that the overall rating has not been approved, the advertisement has been approved and the presentation has not been approved, the feedback code of "1-1-0" is assigned as the overall rating for the advertisement.

In the event that the content of the advertisement has not been approved, but the presentation has been approved of the viewer, a feedback code of "1-0-1" is assigned as the rating for the television advertisement (block 536). In the event that the overall rating, the content and the television advertisement presentation have not been approved, the rating would be assigned a feedback code of "1-0-0."

Referring now to FIG. 5B, an illustrative embodiment of the processing conducted by the display device or advertisement server (or content/ad server) to determine the feedback code for some programming is shown. Herein, the programming identifier (PROGRAM_ID) is provided to the database in a manner similar to what was found for computing the overall rating for the advertisement. The same analysis applies where the feedback code of the programming is first determined (block 550), and from that, more granularity is conducted as to whether the content (blocks 560 and 565) and the presentation for the programming (blocks 570, 572, 574, 576) have been approved in a manner described above.

Figure 6:
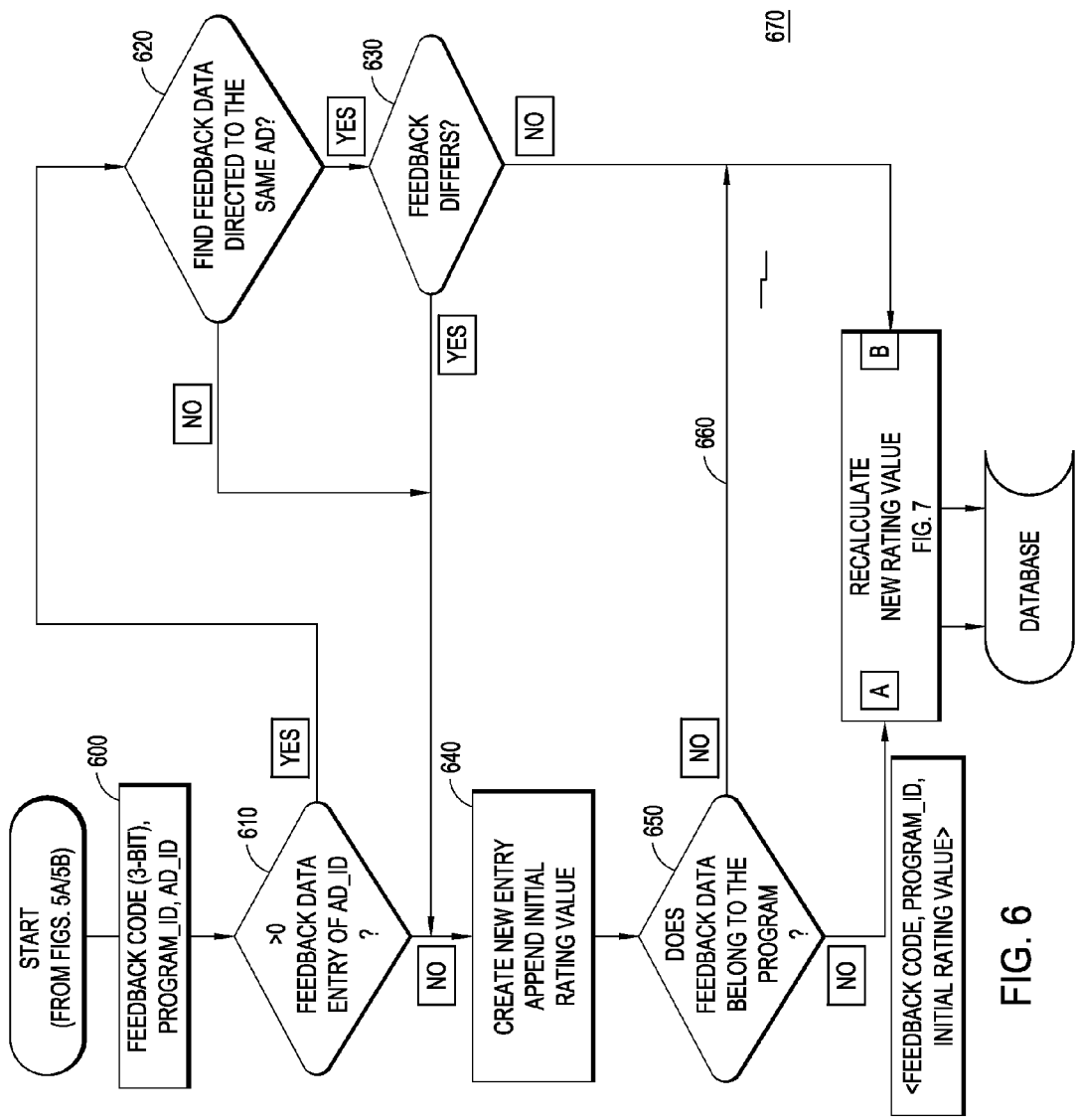
FIG. 6 is an illustrative embodiment for computing a rating value to be storage into the database.

Referring now to FIG. 6, an illustrative embodiment of the computation of the rating value and storage into the database is shown. Initially, as shown in blocks 600 and 610, the AD_ID is used to determine whether there is any previous feedback data entry for the AD_ID. If there are no previous entries for AD_ID, a new entry is created for the advertisement (or program) with an initial rating value provided with the PROGRAM_ID and/or AD_ID and feedback code (see block 650).

If there is any previous entry for AD_ID, feedback data directed to the same advertisement category pair (e.g., shoe advertisement during children program) as the advertisement is recovered (block 620). The new feedback is compared with previous feedback of the same category (block 630). If they are not the same, a new entry is created with an initial rating value provided with the AD_ID and/or PROGRAM_ID and feedback code (block 640).

In the event that the feedback is directed to a program, the feedback code, PROGRAM_ID and initial rating value are provided to recalculate the new rating value for the program (block 650). Otherwise, the feedback code, AD_ID, PROGRAM_ID and initial rating value are provided (block 660).

In the event that the feedback data is directed to the same advertisement and program category pair and the feedback does not differ, a previous rating value is provided for recalculation. In other words, the feedback code, PROGRAM_ID, AD_ID and the previous rating value are provided to software loaded in the advertisement server (or display device) to compute the new rating value as shown as input "B" in block 670.

Figure 7:
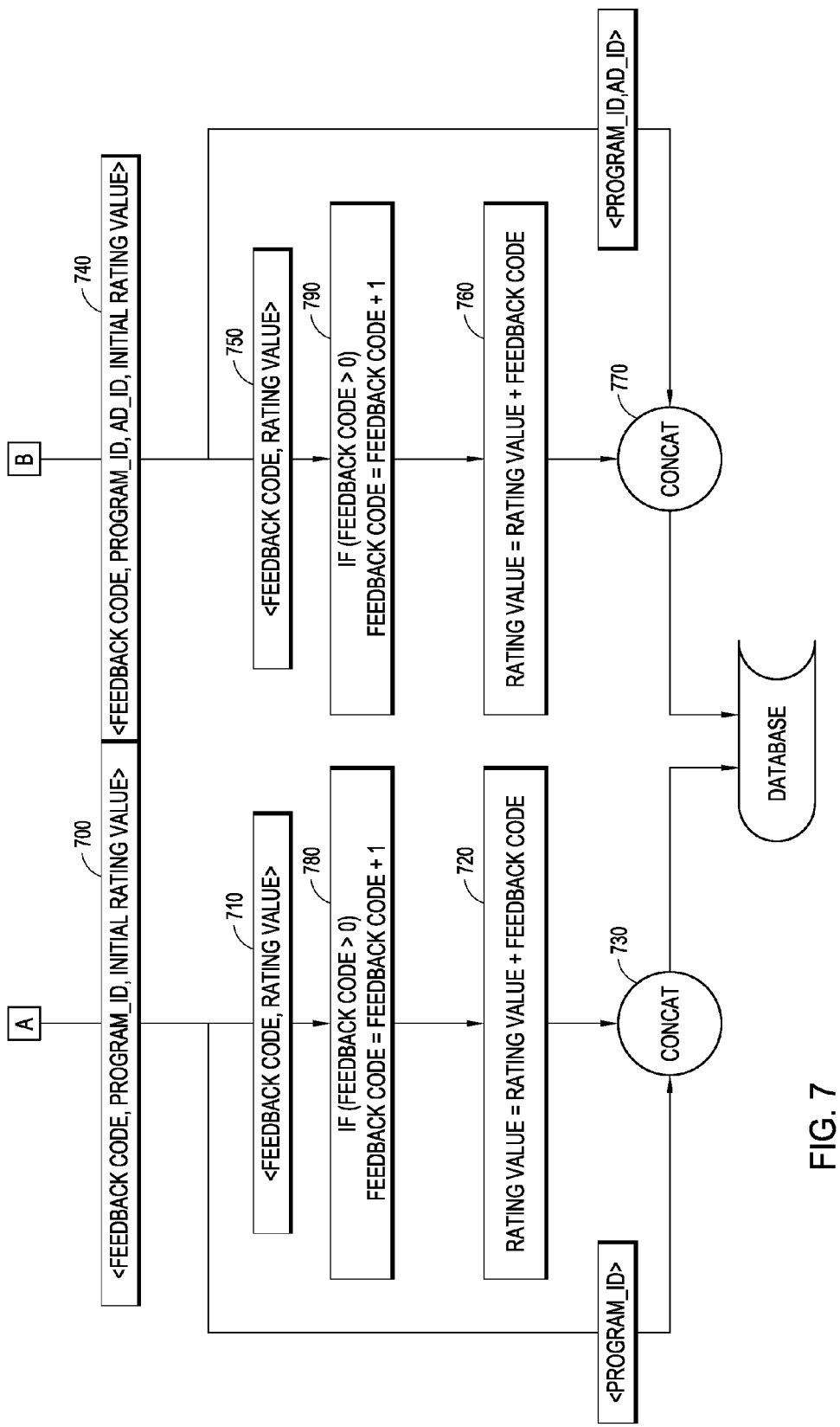
FIG. 7 is an illustrative flowchart for calculation of a new rating value using the feedback code.

Referring now to FIG. 7, an illustrative flowchart for calculation of a new rating value using the feedback code is shown. Herein, if the digital content involves programming (PROGRAM_ID) as represented by input "A", the PROGRAM_ID is separated from input also including the feedback code and a prior (or initial) rating value (blocks 700 and 710). If the feedback code is greater than zero (thumbs-up), it is incremented by one (block 780). Thereafter, the new rating value is computed using the prior (or initial) rating value and the feedback code (block 720). Thereafter, the new rating value is concatenated with the PROGRAM_ID for storage within a database entry assigned to the particular programming (block 730).

Referring still to FIG. 7, if the feedback code of block 600 is directed advertisement (AD_ID), both the PROGRAM_ID and AD_ID are separated from input signals also including the feedback code and the current rating value (blocks 740 and 750). If the feedback code is greater than zero (thumbs-up), it is incremented by one (block 790). Thereafter, a new rating value is computed using the prior (or initial) rating value and the feedback code (block 760). Thereafter, the new rating value is concatenated with the PROGRAM_ID and AD_ID for storage within a database entry assigned to the particular advertisement (block 770).

For example, a thumbs-up representation is assigned a feedback code between +3 to 0 while a "thumbs-down" representation is assigned a feedback code ranging from −4 to −1. The "thumbs-up" coding is adjusted by adding +1 to increase its range to +4 to +1. The rating value is a summation of the number of feedback responses, directly or indirectly, of a particular advertisement. Indirect responses occur when the viewer provides no new feedback for an advertisement with previous feedback. The inaction on the viewer's side means that the last feedback is acceptable. A "flip-flop" feedback is detected when the advertisements content relevancy (second bit) is changed.

FIGS. 8 and 9 show different fields used to categorize an advertisement. As shown in FIG. 8, these advertising categories are configured to identify the viewing audience 800 and the good and/or services 810 to which the advertisement is directed. Hence, when a particular type of advertisement is to be downloaded to the display device, the advertisement server can ascertain and download targeted advertisements. For instance, as shown in FIG. 9, a luxury car commercial is identified by selecting a field (or bit) associated with an "Automobile Products and Services" category 900 and is to be directed to a viewing audience with driving privileges (e.g., senior, adult, teen) of any gender as shown in categories 910 and 920.

Figure 10:
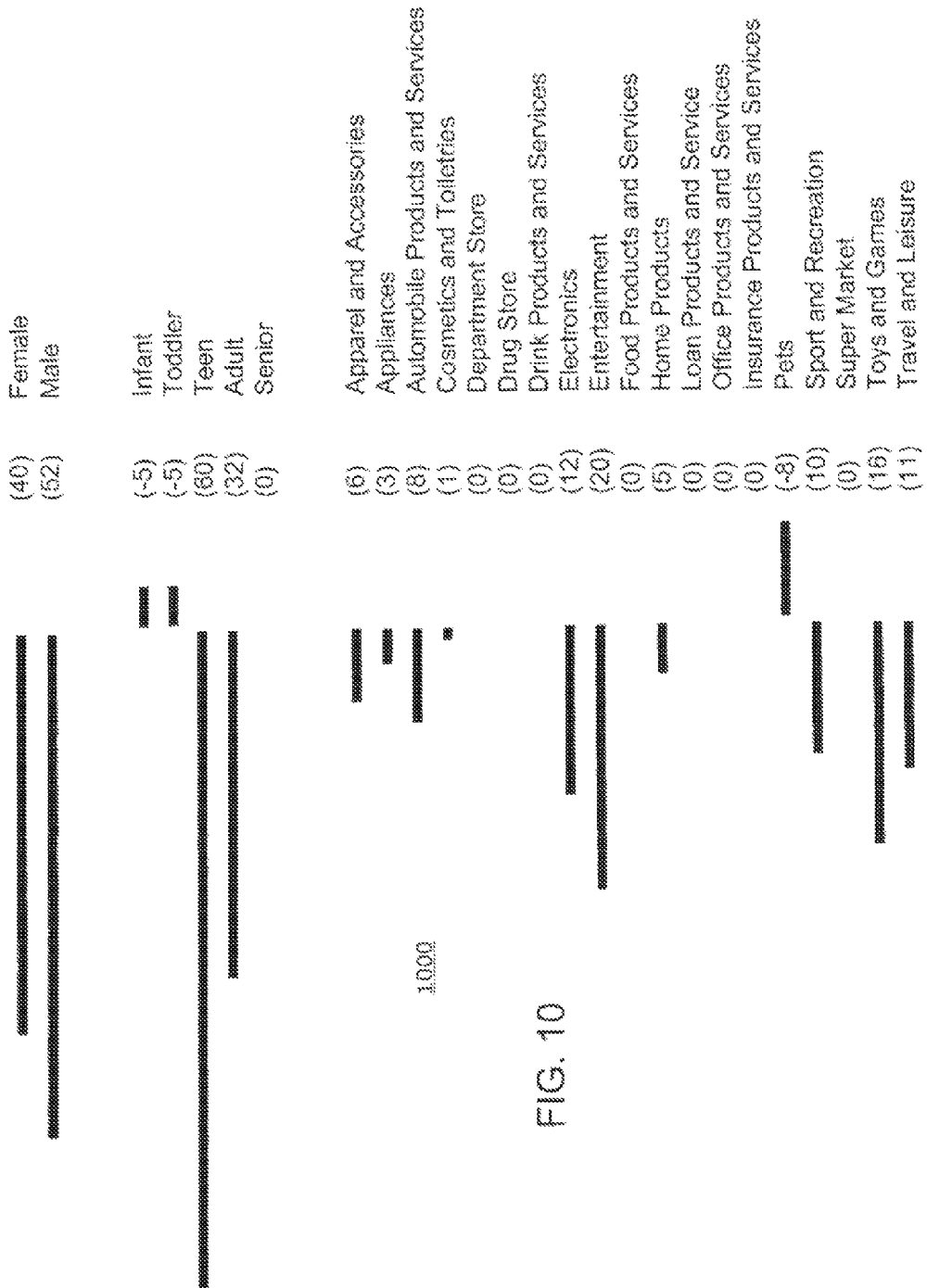
FIG. 10 is an illustrative embodiment of a household profile.

Referring now to FIG. 10, an illustrative embodiment of an example of a household profile 1000 is shown, where household profile 1000 is formulated from a collection of feedback data. Household profile 1000 approximates that this household does not have an infant, toddlers or a pet. It has at least one teenager and one adult.

Although embodiments of the invention have been described with respect to specific examples, it will be apparent to those of ordinary skill in the art that the invention is not limited to these specific examples or subsystems but extends to other embodiments as well. For instance, advertisement substitution may be applicable to downloaded audio advertisement with listener feedback in a similar manner.

What is claimed is:

1. A system comprising:
    a server comprising one or more processors, the server configured to:
        determine a target audience of an advertisement,
        determine a target audience of a first program,
        identify a plurality of feedback responses received in response to presentations of the advertisement,
        identify from the plurality of feedback responses at least one feedback response received in response to the presentation of the advertisement during a second program having the same target audience as the target audience of the first program,
        determine a rating of the at least one feedback response,
        generate a selectable feedback image based at least in part on the rating of the at least one feedback response,
        cause one or more displays to display the selectable feedback image during presentation of the advertisement during the first program,
        receive feedback information based at least in part on a selection of the selectable feedback image,
        determine an estimated household profile to which a user is a member based at least in part on the feedback information and historical feedback data, and
        obtain replacement advertisements to replace subsequent advertisements based at least in part on the estimated household profile.

2. The system of claim 1, wherein during the first program comprises during a commercial break of the first program.

3. The system of claim 1, wherein during the second program comprises during a commercial break of the second program.

4. The system of claim 1, wherein the feedback information includes a value representing an overall impression of the advertisement, a value representing an impression by the user of a subject matter advertisement, and a value representing an impression by the user of a presentation level of the advertisement.

5. The system of claim 1, wherein the advertisement is a viewable advertisement.

6. The system of claim 1, wherein the first and second programs are first and second viewable programs.

7. The system of claim 1, wherein the one or more displays route the advertisement to a remotely located second one more displays for display.

8. A method comprising:
    determining a target audience of an advertisement;
    determining a target audience of a first program;
    identifying a plurality of feedback responses received in response to presentations of the advertisement;
    identifying from the plurality of feedback responses at least one feedback response received in response to the presentation of the advertisement during a second program having the same target audience as the target audience of the first program;
    determining a rating of the at least one feedback response;
    generating a selectable feedback image based at least in part on the rating of the at least one feedback response;
    causing one or more displays to display the selectable feedback image during presentation of the advertisement during the first program;
    receiving feedback information based at least in part on a selection of the selectable feedback image;
    determining an estimated household profile to which a user is a member based at least in part on the feedback information and historical feedback data; and obtaining replacement advertisements to replace subsequent advertisements based at least in part on the estimated household profile.

9. The method of claim 8, wherein during the first program comprises during a commercial break of the first program.

10. The method of claim 8, wherein during the second program comprises during a commercial break of the second program.

11. The method of claim 8, wherein the feedback information includes a value representing an overall impression of the advertisement, a value representing an impression by the user of a subject matter advertisement, and a value representing an impression by the user of a presentation level of the advertisement.

12. The method of claim 8, wherein the advertisement is a viewable advertisement.

13. The method of claim 8, wherein the first and second programs are first and second viewable programs.

14. The method of claim 8, wherein the one or more displays route the advertisement to a remotely located second one more displays for display.

15. A computer readable, non-transitory storage medium having one or more computer-executable instructions, the one or more computer-executable instructions, when executed, cause one or more processors to:
determine a target audience of an advertisement;
determine a target audience of a first program;
identify a plurality of feedback responses received in response to presentations of the advertisement;
identify from the plurality of feedback responses at least one feedback response received in response to the presentation of the advertisement during a second program having the same target audience as the target audience of the first program;
determine a rating of the at least one feedback response;
generate a selectable feedback image based at least in part on the rating of the at least one feedback response;
cause one or more displays to display the selectable feedback image during presentation of the advertisement during the first program;
receive feedback information based at least in part on a selection of the selectable feedback image;
determine an estimated household profile to which a user is a member based at least in part on the feedback information and historical feedback data; and
obtain replacement advertisements to replace subsequent advertisements based at least in part on the estimated household profile.

16. The computer readable, non-transitory storage medium of claim 15, wherein during the first program comprises during a commercial break of the first program, and during the second program comprises during a commercial break of the second program.

17. The computer readable, non-transitory storage medium of claim 15, wherein the feedback information includes a value representing an overall impression of the advertisement, a value representing an impression by the user of a subject matter advertisement, and a value representing an impression by the user of a presentation level of the advertisement.

18. The computer readable, non-transitory storage medium of claim 15, wherein the advertisement is a viewable advertisement.

19. The computer readable, non-transitory storage medium of claim 15, wherein the first and second programs are first and second viewable programs.

20. The computer readable, non-transitory storage medium of claim 15, wherein the one or more displays route the advertisement to a remotely located second one more displays for display.

\* \* \* \* \*

UNITED STATES PATENT AND TRADEMARK OFFICE
CERTIFICATE OF CORRECTION

| | |
|---|---|
| PATENT NO. | : 9,015,748 B2 |
| APPLICATION NO. | : 14/132256 |
| DATED | : April 21, 2015 |
| INVENTOR(S) | : Art Pharn |

It is certified that error appears in the above-identified patent and that said Letters Patent is hereby corrected as shown below:

In the drawings

Sheet 7 of 14 (Reference Numeral 400, FIG. 4) at line 4, Change "ADVERTISMENT" to --ADVERTISEMENT--.

In the specification

In column 2 at line 24, Change "(PVRS)" to --(PVRs)--.

In column 6 at line 39, Change "310)" to --310).--.

In the claims

In column 10 at lines 45-46, In Claim 7, change "one more" to --one or more--.

In column 11 at line 22, In Claim 14, change "one more" to --one or more--.

In column 12 at line 34 (approx.), In Claim 20, change "one more" to --one or more--.

Signed and Sealed this
Twelfth Day of January, 2016

Michelle K. Lee
*Director of the United States Patent and Trademark Office*